INVENTOR
BRUNO CAMMIN-CHRISTY
Albert F. Kronman
ATTORNEY

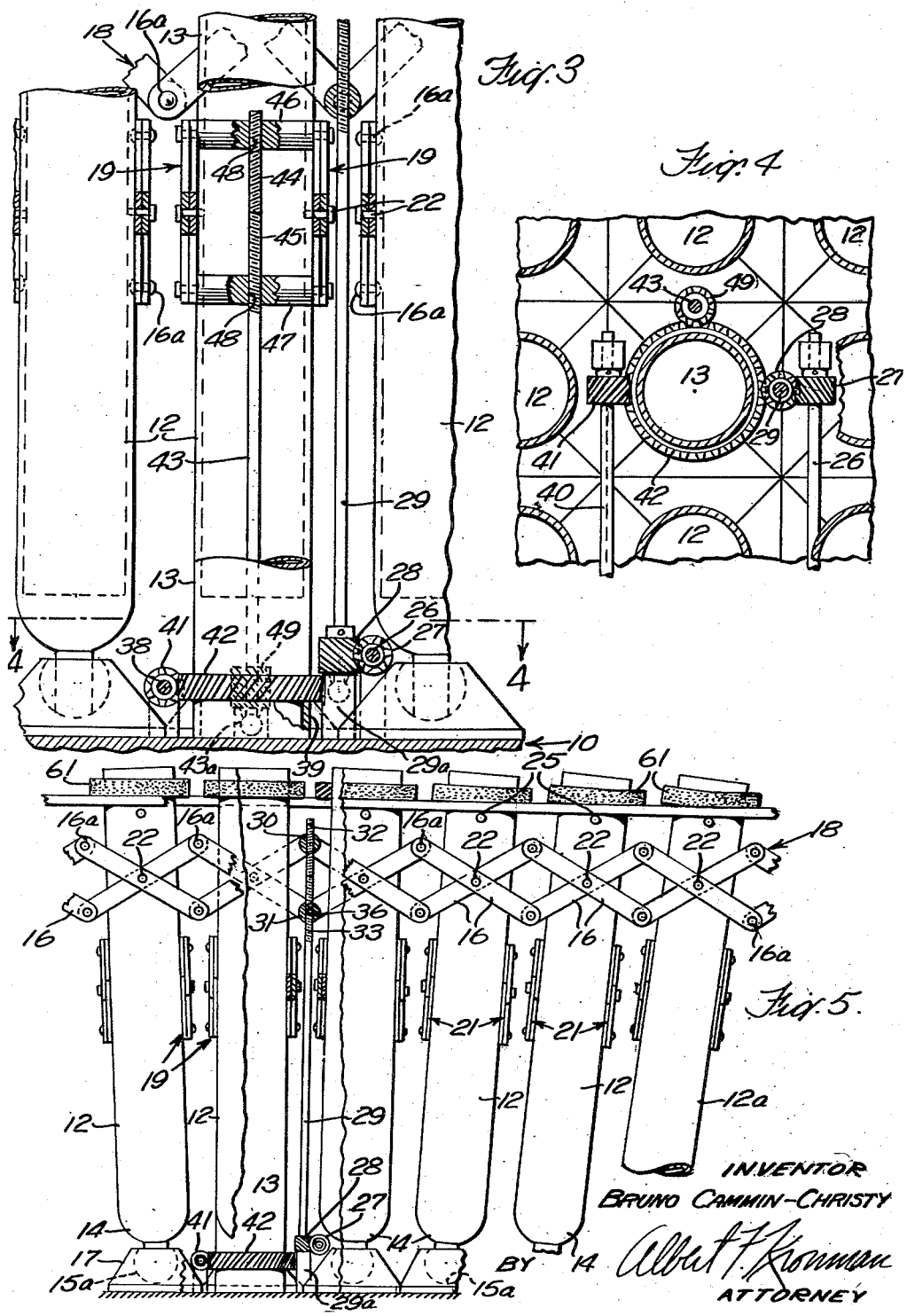

United States Patent Office 2,807,194
Patented Sept. 24, 1957

2,807,194
ROCKET LAUNCHING DEVICE

Bruno Cammin-Christy, New York, N. Y., assignor of twenty-five percent to John Radtke, Cambria Heights, twenty-five percent to John Joseph Radtke, Queens Village, and fifteen percent to August Radtke, Valley Stream, N. Y.

Application August 9, 1954, Serial No. 448,560

1 Claim. (Cl. 89—1.7)

This invention relates to a rocket launching device, and more particularly to a ground-to-air anti-aircraft rocket launcher.

Present ground defense against attack from the air involves the placement of numerous anti-aircraft batteries in and around a target area. Despite extensive anti-aircraft fire from conventional weapons attacking planes are able to penetrate the defenses by employing what is termed "evasive action." This "evasive action" consists of abrupt deviations in the line of flight and/or sudden changes in altitude. By the employment of evasive maneuvers many planes are able to avoid destruction by anti-aircraft fire, even where fire is controlled by radar. It is, of course, obvious that the greater the concentration of anti-aircraft fire the less effective will be evasive maneuvering by attacking planes.

Accordingly, it is an object of this invention to provide a rocket launcher capable of firing a multiplicity of rockets and thereby produce a "fire pattern" of such concentration that the effectiveness of evasive maneuvering will be greatly minimized.

Another object of the present invention is to produce a rocket launcher having a multiplicity of rocket tubes, which tubes may be directed as a unit and adjusted to produce a variety of "patterns" of fires.

A further object of this invention is to provide a relatively inexpensive anti-aircraft device, yet one which will provide a more superior defensive fire than more expensive conventional anti-aircraft devices.

A still further object of the present invention is to produce a rocket launcher capable of firing the type of rocket which carries a line suspended therefrom, as described in my application simultaneously filed herewith.

A feature of this invention is the means whereby the rocket tubes may be adjusted in two planes to vary the area and concentration of the "fire pattern."

Another feature of the present invention is the ball and socket mounting of the rocket tubes to the rocket tube support plate, which permits adjustment of the tubes in two planes.

A further feature of this invention is the means by which the rocket tube support plate may be tilted from a horizontal plane thereby enabling the aiming of all the tubes as a unit.

A still further feature of the present invention is the interconnection of the rocket tubes, longitudinally and laterally by means of lazy-tong assemblies.

Another feature of this invention is its use of collars or yokes to actuate the rows of tubes which are interconnected by guide lazy-tong assemblies.

The invention consists of the construction, combination and arrangement of parts, as herein illustrated, described and claimed.

In the accompanying drawings, forming a part hereof is illustrated two forms of embodiment of the invention, in which drawings similar reference characters designate corresponding parts, and in which:

Figure 3 is an enlarged fragmentary view in section of the center tubes showing the lazy-tong actuating means.

Figure 4 is a sectional view taken on line 4—4 of Figures 2 and 3 looking in the direction of the arrows.

Figure 5 is a fragmentary view of the launcher showing the longitudinal rows of tubes in their maximum position of tilt.

Figure 1:
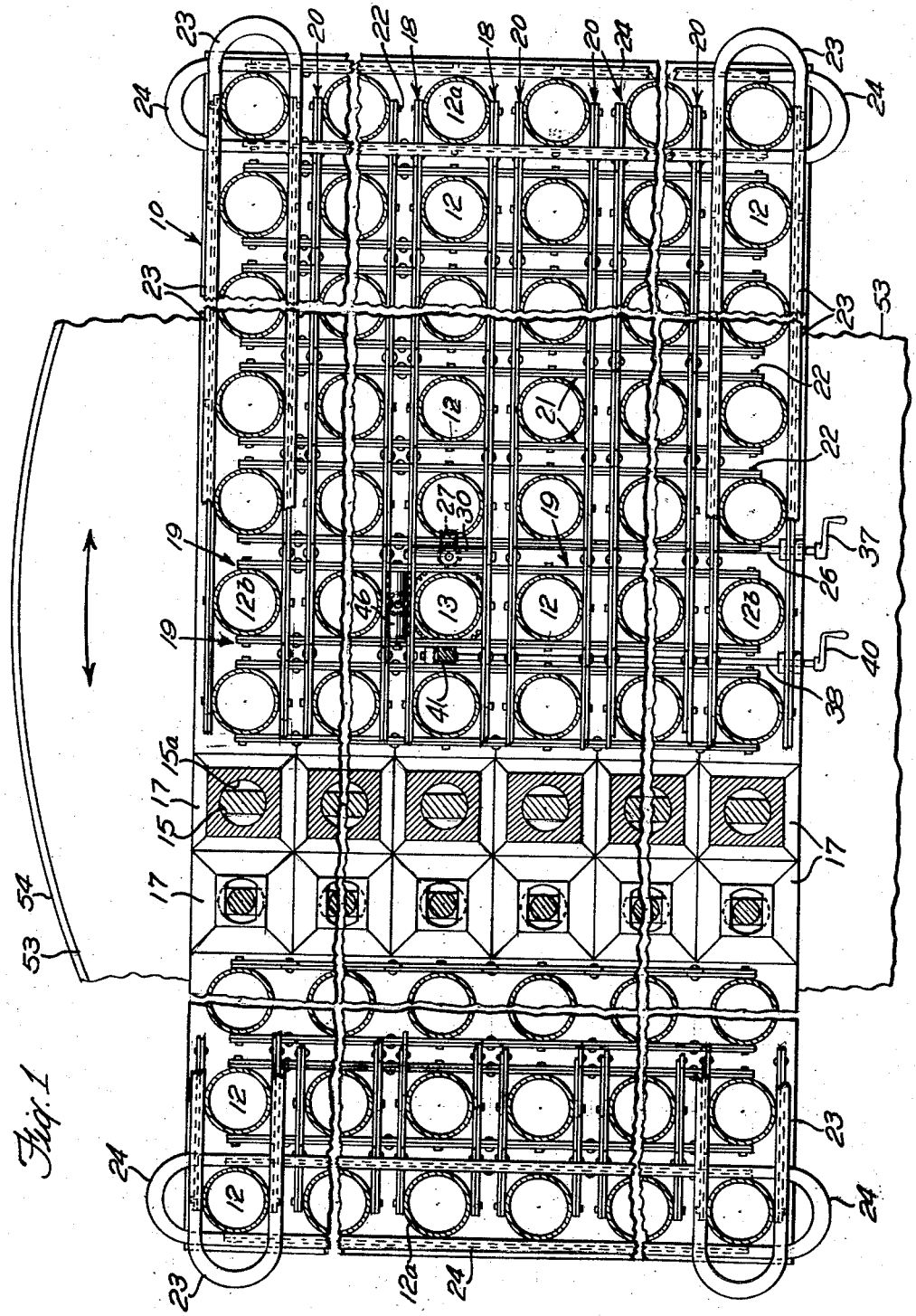
Figure 1 is a sectional view of a rocket launcher according to this invention taken along line 1—1 of Figure 2.
Figure 2:
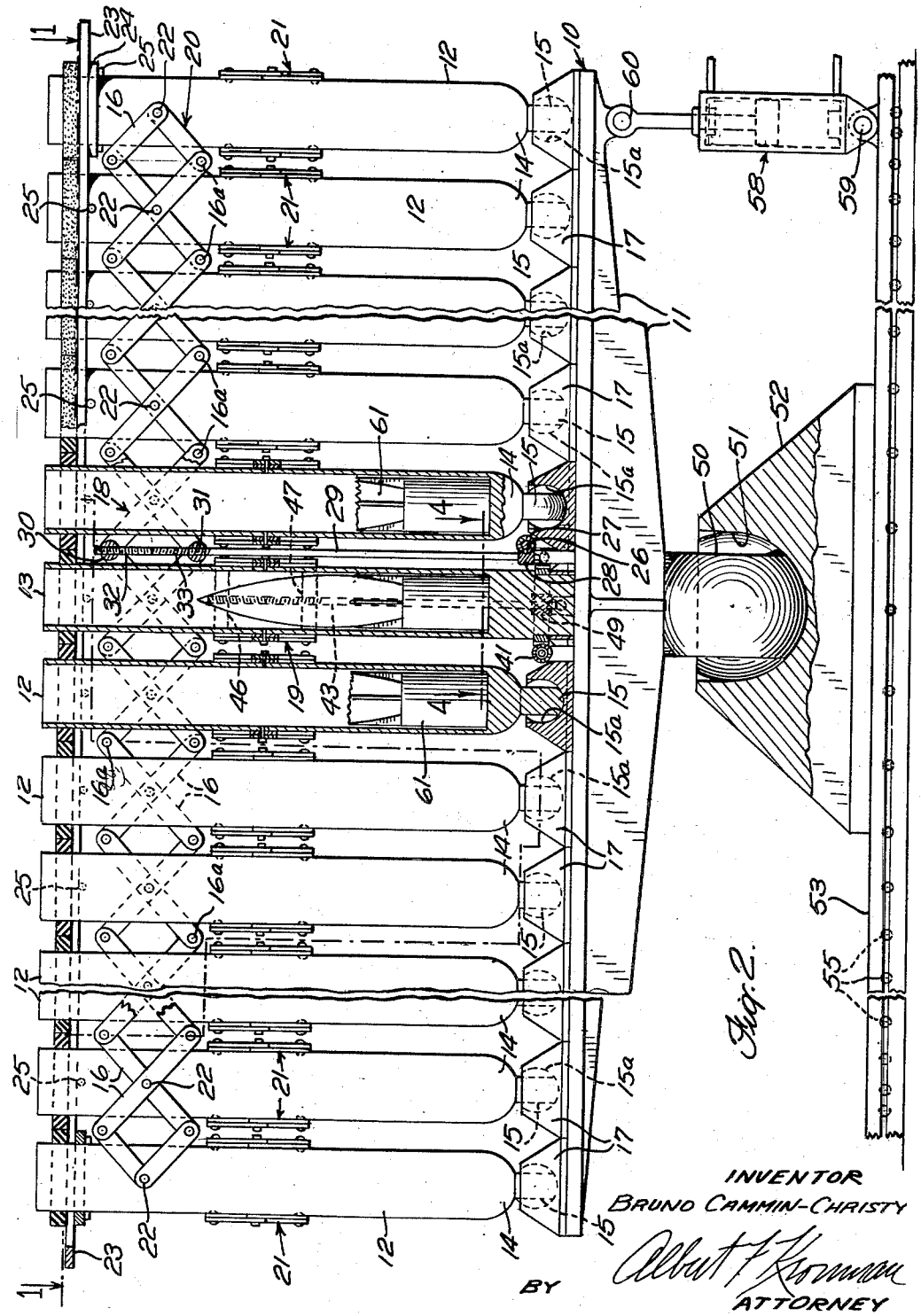
Figure 2 is a side view in elevation with parts broken away of the rocket launcher shown in Figure 1.

Referring to the drawings, specifically Figures 1 and 2, 10 designates a rocket tube support plate which may be of any desired shape. The plate 10 is reenforced on its underside by ribs 11. Supported upon the upper surface of the plate 10 are a plurality of rocket tubes 12, arranged in longitudinal and transverse rows. The tube 13, located in the center of the bank of tubes 12, is fixedly and normally secured to the plate 10, all the other tubes 12 are pivotally secured to the plate 10. The fixed tube 13 serves as an anchor post for the movable tubes 12.

Each tube 12 is closed at one end, as indicated at 14, and has a ball pivot member 15 secured to the closed end 14. The ball member 15 is adapted to ride within a socket 15ᵃ of a base member 17. Each base member 17 is attached to the plate 10 by welding, or by any other suitable means.

The center longitudinal row of tubes 12 are interconnected by two lazy-tong assemblies 18 spaced on opposite sides of the tubes 12 (best shown in Figure 1). The center transverse row of tubes 12 are interconnected by spaced lazy-tong assemblies 19. The lazy-tong assemblies 18 and 19 will be hereinafter referred to as drive tong assemblies. The remaining longitudinal and transverse rows of tubes 12 are interconnected by pairs of lazy-tong assemblies 20 and 21, respectively, hereinafter called guide tong assemblies. The links 16, forming the lazy-tong assemblies 18, 19, 20 and 21 are pivotally mounted at 22 to each of the rocket tubes 12 and 13. Each link 16 is pivotally connected to the next link by a coupling pin 16ᵃ. In the above described structure, therefore, each tube 12 is engaged by two sets of lazy-tong assemblies normal to each other. As shown in Figure 2, the drive and guide tong assemblies 18 and 20 are secured above the drive and guide tong assemblies 19 and 21 and are nearer the discharge end of the tubes 12. The drive tong assemblies 18 and 19 are actuated by means hereinafter described.

The peripheral or outermost rows of tubes are embraced by four elongated oval collars or yokes 23 and 24, positioned above the lazy-tong assemblies 18, 19, 20 and and are suitably secured to each of the peripheral tubes 21 and near the discharge ends of the tubes 12. The collars 23 and 24 rest upon pins 25, which extend from 12 (see Figures 2 and 5). The purpose of the collars 23 and 24 will be hereinafter more fully described.

The drive tong assemblies 18 are actuated by a shaft 26 which is journaled within bearings (not shown) upon the upper surface of the plate 10. The shaft 26 projects beyond one edge of the plate 10 and extends inwardly between the middle transverse row of tubes 12 to the center tube 13. On the inner end of the shaft 26 is secured a spiral gear 27. In mesh with the gear 27 is a second spiral gear 28 mounted upon a vertical shaft 29. Shaft 29 is axially journaled at 29ᵃ to the plate 10. The shaft 29, at its upper end, is provided with a left hand threaded part 32 and a right hand threaded part 33. Connecting the two drive tong assemblies 18, adjacent the center tube 13, are two threaded spacer members 30 and 31. Each spacer member 30 and 31 is adapted to threadably receive one of the threaded portions 32 and 33 of the shaft 29. Upon the rotation of the shaft 29, the spacer members 30 and 31 ride upon the threaded portions 32 and 33, toward or away from each other depending upon the direction of rotation.

To swing the longitudinal rows of the tubes 12 to the right and left of the center transverse row of the tubes to the open position, shown in Figure 5, the shaft 26 is rotated by any suitable means, such as a crank 37 (see Figure 2). By turning the crank 37, the shaft 29 is rotated by means of the gear 27 mounted on the shaft 26 and the gear 28 secured to shaft 29. Upon rotation of shaft 29, the spacer members 30 and 31 are drawn closer together under the urging of the oppositely threaded portions 32 and 33 of shaft 29. As the spacers 30, 31 are drawn closer together, the links 16 are brought nearer to a horizontal position, thereby exerting an outward thrust from the center tube 13. As the links 16 of the drive tong assemblies 18 move the outer tubes 12$^a$ of the center longitudinal row of tubes 12, the said tubes carry with them the collars 23. The movement of the collars 23 swings the other tubes embraced therein outwardly of the center of the launcher. Since the other tubes 12 in the longitudinal rows are connected by pairs of guide tong assemblies 20 to the end tubes within the collars 23, the other tubes 12 are pulled outwardly of the center of the device under the force exerted by the collars 23.

To allow for a slight tilting of the shaft 29 and to prevent binding at the gears 27 and 28 resulting thereby, the shaft 28 is provided with a ball and socket assembly 29$^a$ as best shown in Figure 3. As an alternate form a universal coupling may be interposed at 29$^a$ adjacent gear 29.

A somewhat similar structure, as above described, is employed to pivot the transverse tubes 12 outwardly of the center longitudinal row of tubes 12. Thus a shaft 38 is rotatably mounted to the upper surface of the plate 10 on the opposite side of the stationary tube 13 from the shaft 26. One end of the shaft 38 projects beyond the edge of the plate 10. The remainder of the shaft 38 extends inwardly to a point slightly beyond the center line of the stationary tube 13. The shaft 38 is rotated as by a crank 40, or some other suitable means secured to the end thereof. At the inner end of the shaft 38, there is provided a spiral gear 41. The spiral gear 41 is in mesh with a spiral ring gear 42 which is rotatably carried by the stationary tube 13. A sleeve 39 provides a bearing for the ring gear 42. A shaft 43, similar to shaft 29, is axially journaled by a ball and socket assembly 43$^a$ to the upper surface of the plate 10, as best shown in Figure 3. The shaft 43 is provided with right and left hand threaded portions 44 and 45. A second pair of threaded spacer members 46 and 47 are secured between the drive assemblies 19 at a point adjacent the central fixed tube 13. Each spacer member 46 and 47 is adapted to threadably receive one of the right and left hand threaded portions 44 and 45 of the shaft 43. At the lower end of the shaft 43 opposite the spacer members 46 and 47, there is secured a spiral gear 49 which is in mesh with the ring gear 42.

In order to pivot the tubes 12, forming transverse rows, outwardly from the center longitudinal row of tubes 12, the crank 40 of the shaft 38 is rotated. Upon rotation of the shaft 38, the ring gear 42 is rotated about the fixed tube 13 by means of the gear 41. The rotary motion of the ring gear 42 is transmitted to shaft 43 by gear 49 which is secured to shaft 43. As the shaft 43 turns, the spacer members 46 and 47 are drawn closer together on the oppositely threaded portions 44 and 45 of the shaft 43. Since the spacer members 46 and 47 are secured to the drive tong assemblies 19, the links 16 of the assemblies 19, are pivoted about their respective pivot points 22 to a more horizontal position thereby extending the length of the drive tong assemblies 19. As the tubes 12, comprising the center transverse row of tubes, are secured to the links 16, the tubes 12 are tilted outwardly. The peripherial or end tubes 12$^b$ of the center transverse row of tubes, upon being forced outwardly, pull with them the collars 24. Movement of the collars 24 is transmitted to the other peripheral tubes 12. Since the peripheral tubes 12 are connected to the other tubes 12 by the guide tong assemblies 21, the tubes 12 are pivoted outwardly of the longitudinal row of tubes 12 under the pull exerted thereon by the collars 24.

The link coupling members 16$^a$, joining the links 16 of the lazy-tong assemblies 18, 19, 20, and 21 loosely hold the links 16 together. This looseness allows sufficient flexibility in the lazy-tong assemblies 18, 19, 20 and 21 to permit a tilting of the tubes 12 in both a longitudinal and a transverse direction at the same time. It is therefore possible to swing the tubes 12 so as to increase the area of the "pattern of fire" in two directions.

Each tube 12 is provided with a resilient ring member 62 above the collars 23 and 24 and adjacent the discharge end of the tubes 12. The rings 62 serve as shock absorbers and relieve the lazy-tong assemblies 18, 19, 20 and 21 of some of the load of the tubes.

By a suitable adjustment of the entire assembly, above described, the "pattern of fire" of the rockets may be varied to meet different formations of flight groupings of attacking aircraft. By pivoting the tubes 12 outwardly of the center transverse row of tubes the "pattern of fire" is increased longitudinally. Further, if only the tubes 12 are pivoted outwardly of the center longitudinal row of tubes, the "pattern of fire" will be increased transversely. The degree of tilt of the tubes will govern the area of the fire pattern and the concentration of fire within that area. As was mentioned above, the tubes 12 may be tilted in two planes at the same time thereby effecting a change in the area of the "pattern of fire" in both a longitudinal and a transverse direction.

To return the tubes 12 to a normal position, as shown in Figures 1 and 2, the cranks 37 and 40 are rotated in the opposite direction. Opposite rotation of the shafts 28 and 43 causes the spacer members 30 and 31, 46 and 47 to be forced apart by the right and left hand threaded portions 32 and 33, 44 and 45, of the shafts 29 and 43. As the tubes 12$^a$ and 12$^b$ are pulled inwardly by the drive assemblies 18 and 19, respectively, the collars 23 and 24 force the other tubes inwardly through the guide assemblies 20 and 21.

The entire structure, described in detail in the foregoing paragraphs, is adjustably supported by the structure hereinafter described, and best shown in Figure 2.

On the underside of the plate 10, and centrally thereof, is secured a large ball member 50 receivable within a socket 51. The socket 51 is formed in the top of a tapered block 52 which is centrally supported on a turntable 53. The turntable 53, which may be circular, is rotatably supported on a base member 54 through a plurality of balls 55. The balls 55 ride within an annular groove (not shown) in the under side of the turntable 53 and a similar groove (not shown) in the upper surface of the base member 54. The base 54 is suitably anchored to the ground or to the deck of a ship. The turntable 53 may be rotated by a gear train or by any other suitable means (not shown).

To direct the tubes 12, secured to the plate 10, in the direction of attacking aircraft, the plate 10 may be tilted by means of a hydraulic assembly 58. The hydraulic assembly 58 is pivotally mounted at 59 to the end of the turntable 53, and pivotally secured at 60 to the plate 10. The conventional hydraulic fluid reservoir, accumulator tank, control valves, and the like, are employed but not shown.

The launching device, disclosed herein, may be provided with a conventional electrical firing circuit for discharging the rockets 61. This circuit may be arranged to permit progressive firing of the rockets or "salvo" type of fire.

While the foregoing driving structure herein disclosed is the preferred embodiment of this invention, it is within the purview of the present invention to swing the tubes 12 by an actuating means (not shown) which is directly coupled to one or more of the pivotal tubes 12. As a result of such coupling, all the tubes 12 which are embraced by collars 23 and 24 will be moved and in turn affect all those to which they are linked by tongs 18, 19, 20 and 21. It is to be understood that such an actuating structure would require heavier and structurally stronger links 16 to prevent the possibility of damage by bending of the tubes' lazy-tongs within the assembly as described herein.

It is apparent from the foregoing disclosure that a rocket launcher has been provided which may be adjusted to vary the pattern and direction of fire. The device provides a multiplicity of rocket tubes which may be directed as a unit and also adjusted in two planes. A devastating barrage may be directed against attacking aircraft by this device and a particularly impregnable defensive fire is effected when the device fires the rocket projectiles which have cables suspended therefrom, as described in a co-pending application. In addition, the launching device is relatively inexpensive to fabricate as compared with conventional anti-aircraft weapons, while producing a more effective pattern of fire.

Having thus fully described the invention, what is claimed as new and desired to be secured by Letters Patent of the United States, is:

A rocket launching device comprising, a support plate, an adjustable positioning assembly consisting of a base member located beneath said plate, a turntable rotatably supported by said base, a block member attached to the upper surface of the turntable, and pivotally coupled to the underside of said plate, and means interconnecting the said turntable and plate whereby the plate may be selectively tilted from a horizontal plane, a plurality of rocket tube members pivotally secured at one end thereof to said plate, a fixed central rocket tube member secured to the plate, a plurality of lazy-tong assemblies pivotally coupled to and interconnecting the said pivoted tube members thereby permitting said pivoted guide members to be swung through a plurality of arcs, and guide member actuating means carried by the base plate, said actuating means consisting of a shaft journaled upon the base, a pair of internally threaded spacer members, one of said threads being a right-hand and the other a left-hand thread, said spacers being coupled to at least one of the lazy-tong assemblies, and gear means coupled to said first shaft and connected to the spacer members for transmitting motion to said rocket guide members.

References Cited in the file of this patent

UNITED STATES PATENTS

| 36,448 | Billinghurst et al. | Sept. 16, 1862 |
| 1,025,972 | Geisel | May 14, 1912 |
| 1,334,983 | Arter | Mar. 30, 1920 |
| 1,448,587 | Arntzen | Mar. 13, 1923 |

FOREIGN PATENTS

| 268,571 | Switzerland | Sept. 1, 1950 |